United States Patent
Landler et al.

(10) Patent No.: US 10,315,904 B2
(45) Date of Patent: Jun. 11, 2019

(54) DEVICE FOR TRANSPORTING CONTAINERS

(71) Applicant: KRONES AG, Neutraubling (DE)

(72) Inventors: Bruno Landler, Neutraubling (DE); Stefan Poeschl, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/579,907

(22) PCT Filed: Mar. 21, 2017

(86) PCT No.: PCT/EP2017/056629
§ 371 (c)(1),
(2) Date: Mar. 5, 2018

(87) PCT Pub. No.: WO2017/162630
PCT Pub. Date: Sep. 28, 2017

(65) Prior Publication Data
US 2018/0170738 A1    Jun. 21, 2018

(30) Foreign Application Priority Data
Mar. 21, 2016 (DE) .................. 10 2016 105 224

(51) Int. Cl.
*B65G 47/86* (2006.01)
*B67C 3/24* (2006.01)
(Continued)

(52) U.S. Cl.
CPC ............ *B67C 3/242* (2013.01); *B65G 47/847* (2013.01); *B67C 7/0013* (2013.01);
(Continued)

(58) Field of Classification Search
CPC .......... B65G 47/846; B65G 2201/0244; B65G 29/00
(Continued)

(56) References Cited

U.S. PATENT DOCUMENTS 4,075,086 A * 2/1978 Marsh, III .............. B07C 5/122
198/473.1
5,082,105 A * 1/1992 Tincati ................. B65G 47/846
198/473.1
(Continued)

FOREIGN PATENT DOCUMENTS

DE    102006012020    9/2007
EP    2407417    1/2012
(Continued)

*Primary Examiner* — James R Bidwell
(74) *Attorney, Agent, or Firm* — Haynes and Boone, LLP (57) ABSTRACT

A device for transporting containers in a beverage filling plant is provided. The device has at least one first clamp, which can be pivoted between an open switching position and a closed switching position and is disposed in a pivoting plane, for holding a container of a first container size, and one second clamp, which can be pivoted between an open switching position and a closed switching position and is disposed in the pivoting plane, for holding a container of a second container size. A first control cam is provided for controlling the switching position of the first clamp and a second control cam is provided for controlling the switching position of the second clamp. The first control cam is disposed in a first control plane parallel to the pivoting plane, and the second control cam is disposed in a second control plane parallel to the pivoting plane. The first control plane and the second control plane are spaced apart from each other.

20 Claims, 5 Drawing Sheets

(51) Int. Cl.
*B67C 7/00* (2006.01)
*B29C 49/42* (2006.01)

(52) U.S. Cl.
CPC ........ *B67C 7/0053* (2013.01); *B29C 49/4205* (2013.01); *B65G 2201/0247* (2013.01)

(58) Field of Classification Search
USPC ............ 198/473.1, 470.1, 480.1, 481.1
See application file for complete search history.

(56) References Cited

U.S. PATENT DOCUMENTS

| | | | |
|---|---|---|---|
| 5,163,543 A * | 11/1992 | Gambetti | B65G 17/26 198/419.3 |
| 9,181,043 B1 * | 11/2015 | Goudy | B65G 29/00 |
| 2010/0294622 A1 | 11/2010 | Graffin | |
| 2016/0107845 A1 * | 4/2016 | Bruch | B65G 21/2072 198/473.1 |
| 2016/0145090 A1 * | 5/2016 | Fahldieck | B67B 3/02 141/369 |
| 2016/0347556 A1 * | 12/2016 | Fahldieck | B65G 47/846 |

FOREIGN PATENT DOCUMENTS

| | | |
|---|---|---|
| EP | 2460746 | 6/2012 |
| JP | 2005088923 | 4/2005 |
| WO | WO 2006/077050 | 7/2006 |

\* cited by examiner

DEVICE FOR TRANSPORTING CONTAINERS

CROSS REFERENCE TO RELATED APPLICATIONS

This application is a national stage of International Application No. PCT/EP2017/056629, filed Mar. 21, 2017, which claims priority from German Patent Application No. 10 2016 105 224.8 filed on Mar. 21, 2016 in the German Patent and Trademark Office, the disclosures of which are incorporated herein by reference in their entirety.

BACKGROUND

Technical Field

The present invention relates to a device for transporting containers in a beverage filling plant and a treatment device for treating containers, for example for filling containers in a beverage filling plant.

Related Art

Devices for transporting containers in beverage filling plants are known. A distinction is made, inter alia, between those transporting devices in which the container stands with its base area on a transport table, and those in which the container is held in its neck area and is suspended during transport. The latter is also known as "neck-handling".

Containers that are held in their neck area are guided by clamps, wherein the clamps grip the container for example below a neck ring. The clamps are designed to hold containers of a particular container size, or with particular neck dimensions. If a transporting device is to transport a different size of container, its clamps must be exchanged. This conversion process creates downtimes. In addition, the conversion needs intervention from outside. In particular in the case of antiseptic systems, such an intervention from outside requires a subsequent sterilization in order to reestablish readiness for operation.

From EP 1841547 B1, it is known, in a device for holding containers, to provide not only a first holder for holding containers of a first container size, but also a second holder for holding containers of a second container size. The holders have bowed elements, against which a container in the holder is to be pressed. Particularly in the case of thin-walled containers, this can result in unintentional deformation of the container.

JP 2005154066 A2 shows the transportation of bottles with differing diameters using a transport starwheel, without conversion of the gripping clamps. For this purpose the gripping elements are designed to be two-sided, with receptacles for differing diameters, and either the smaller or the larger bottles are transported.

US 2010077703 A1 discloses the control, by means of a pivoting movement of a lever, of a gripper finger acting from outside on a container that is to be gripped.

EP 1574460 A1 mentions the changing of the gripper closing position of a gripper, in order to convert from a smaller to a larger container, so that containers of differing container sizes can be accommodated without replacement of the gripper.

SUMMARY

An improved device for transporting containers in a beverage filling plant is described.

Accordingly, a device for transporting containers in a beverage filling plant is proposed, which has at least one first clamp, which can be pivoted between an open switching position and a closed switching position and is disposed in a pivoting plane, for holding a container of a first container size, and one second clamp, which can be pivoted between an open switching position and a closed switching position and is disposed in the pivoting plane, for holding a container of a second container size. A first control cam is provided for controlling the switching position of the first clamp and a second control cam is provided for controlling the switching position of the second clamp, wherein the first control cam is disposed in a first control plane parallel to the pivoting plane, and the second control cam is disposed in a second control plane parallel to the pivoting plane, and the first control plane and the second control plane are spaced apart from each other.

Due to the fact that a first control cam is provided for controlling the switching position of the first clamp, and a second control cam is provided for controlling the switching position of the second clamp, wherein the first control cam is disposed in a first control plane parallel to the pivoting plane and the second control cam is disposed in a second control plane parallel to the pivoting plane, and the first control plane and the second control plane are spaced apart from each other, the switching positions of the two clamps can be controlled independently of each other. It is thereby possible to avoid synchronous switching of both clamps, or continual switching of the clamp that is not used. In particular it is also possible, when containers of the first container size are transported, to open and close the first clamp while at the same time keeping the second clamp for holding containers of the second container size closed, and vice versa. By this means, the two clamps can be disposed closer to each other, without this resulting in collisions between the first clamp and the second clamp. Furthermore, both the device and a treatment device comprising the device can be designed such that they occupy a smaller space, whereby the expense of material for producing the device or the treatment device is reduced, as is the energy demand during operation. Because the containers do not have to be pushed into the clamps against the resistance of preloaded clamping arms, but instead can be gently taken over and handed over by means of the clamps changing between an open switching position and a closed switching position, it is additionally possible to achieve jolt-free takeover and handover of the containers to be transported. This also makes it possible to transport thin-walled containers without deforming them.

In one embodiment, at least one control element is displaceable between a first control position and a second control position, wherein in the first control position the control element can displace the first control cam and in the second control position the control element can displace the second control cam. By this means, it is possible in a simple manner to change between controlling the first clamp and controlling the second clamp, and it is necessary to provide only one control element to control either the first or the second clamp, depending on the control position. In order to provide a robust and simple design, the control element is in various embodiments designed as a switchable bolt.

Alternatively, each of the clamps can be provided with its own control element. In this case, generally at least one of the control elements is displaceable, so that at least one control element can be brought into the control position in order to displace the clamp that is associated with it, and can be brought into a rest position in which it does not interact with the clamp that is associated with it.

Particularly secure switching of the clamp that is to be controlled can be achieved if the first control position is in the first control plane and the second control position is in the second control plane.

If the control element can be pivoted between the first control position and the second control position, and/or can be displaced horizontally and/or in a spiral, it is possible to achieve a particularly simple and robust design of the device, or a treatment device including the device, together with lower maintenance costs.

In various embodiments, the first clamp and/or the second clamp have in each case two pivotable clamping arms, wherein on each of the clamping arms at least one magnetic element for attracting or repelling the clamping arms is disposed. By means of the provision of the magnetic elements, the clamp, which has the two pivotable clamping arms, can be held in a particular rest position. In this case, the clamp is typically held in the open or closed switching position. Each of the two pivotable clamping arms generally has a separate pivot axis, about which it can be pivoted. Alternatively, the two pivotable clamping arms can have a common pivot axis. The open switching position can be achieved as the rest position of the clamp if the magnetic elements are disposed between a holding area of the clamping arms, in which the containers to be transported are held by the clamping arms, and the at least one pivot axis, such that the magnetic elements push the two clamping arms apart due to their mutual magnetic repulsion. If the magnetic elements are disposed such that they attract each other, the rest position of the clamp is as a result in the closed position. Alternatively, the magnetic elements can be disposed opposite the holding area relative to the at least one pivot axis. In this case the effect on the clamping arms of the respective polarities of the magnetic elements is reversed.

A treatment device for treating containers, for example for filling containers in a beverage filling plant, is proposed, which includes at least one treatment carousel for treating, for example filling, the containers, an infeed starwheel for conveying the containers to be treated to the treatment carousel, and a discharge starwheel for conveying the treated containers out of the treatment carousel. At least one device according to one of the aforementioned embodiments is disposed on the infeed starwheel and/or the discharge starwheel and/or the treatment carousel.

In a further development, the treatment carousel has at least one vario clamp which is suitable for accommodating containers of differing container sizes. By this means, both containers of the first container size and containers of the second container size can be transferred to the treatment device. In addition, at least one treatment unit, which may be provided on the treatment carousel, for treating the containers, for example a filling unit for filling containers, can be disposed in a fixed position relative to the treatment carousel above the vario clamp, and used for filling both a container of the first container size and a container of the second container size held in the vario clamp.

The vario clamp generally has two asymmetrical gripping arms, so that at least containers of the first container size and containers of the second container size can be accommodated by the vario clamp, without the two gripping arms colliding. The central axis of a container of the first container size, in a state in which it is held by the vario clamp, is generally concentric with the central axis of a container of the second container size, in a state in which it is held by the vario clamp.

In a further development, the vario clamp has a small gripping arm and a large gripping arm, wherein the large gripping arm is typically disposed to the rear, as viewed in the direction of movement of the treatment carousel. By this means, containers of differing sizes can be gripped, without the small gripping arm and the large gripping arm colliding with each other as they grip the container of the small container size. In addition, this enables a gentle takeover and handover of the container that is to be treated.

Alternatively, at least one device for transporting containers according to one of the aforementioned embodiments can also be disposed on the treatment carousel.

In, for treating containers of the first container size the at least one vario clamp of the treatment carousel can be synchronized with the at least one first clamp of the infeed starwheel and/or of the discharge starwheel. By this means, a container of the first container size that is to be transferred to the treatment carousel from the first clamp of the infeed starwheel can be transferred correctly to the vario clamp, or a treated container of the first container size that is held by the vario clamp can be taken over correctly by the first clamp of the discharge starwheel.

In a further development, for treating containers of the second container size, the at least one vario clamp of the treatment carousel can be synchronized with the at least one second clamp of the infeed starwheel and/or of the discharge starwheel. By this means, a container of the second container size that is to be transferred to the treatment carousel from the second clamp of the infeed starwheel can be transferred correctly to the vario clamp, or a treated container of the second container size that is held by the vario clamp can be taken over correctly by the second clamp of the discharge starwheel.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs, and in order to avoid redundancy repeated description of these elements is in part dispensed with.

Figure 1:
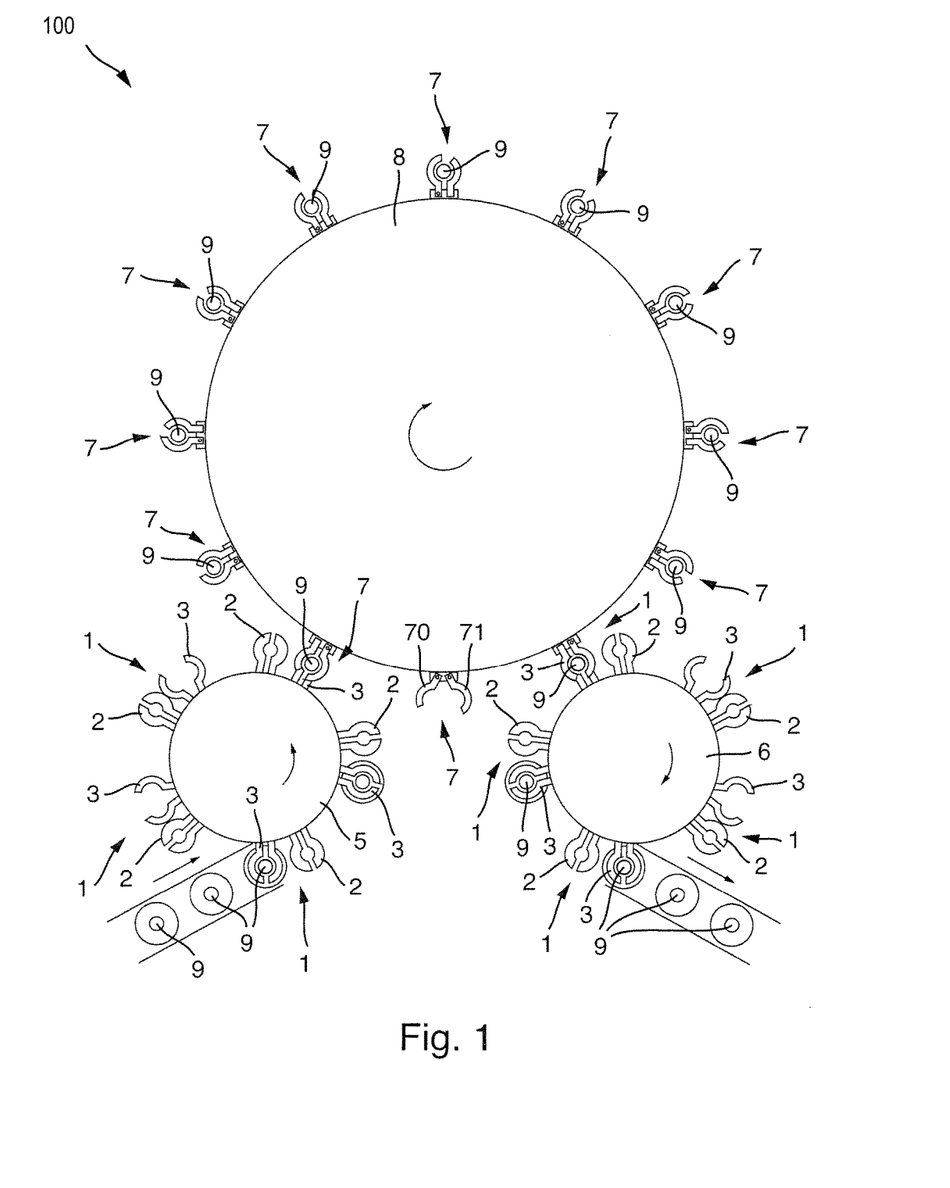
FIG. 1 is a schematic plan view of a treatment device for treating containers, with a treatment carousel on which a plurality of devices for transporting containers are provided.

FIG. 1 shows schematically a plan view of a treatment device 100 for treating containers 9 that are to be treated, with a treatment carousel 8 in a beverage filling plant, wherein the treatment carousel 8 can be designed for example as a filler carousel in a beverage filling plant. An infeed starwheel 5 and a discharge starwheel 6 are further provided, by means of which the containers to be treated 9 are conveyed to the treatment carousel 8 and subsequently removed from it for further processing.

On the infeed starwheel 5 and the discharge starwheel 6 a plurality of devices 1 for transporting containers 9 are provided. The devices 1 for transporting containers each have a first clamp 2, which can be pivoted in a pivoting plane between an open switching position and a closed switching position, for holding a container of a first container size, and a second clamp 3, disposed next to the first clamp 2, which can be pivoted in the pivoting plane between an open switching position and a closed switching position, for holding a container 9 of a second container size.

The treatment device 100 shown in FIG. 1 is initially configured to treat containers 9 of the second container size. For this purpose, the second clamps 3 of the infeed starwheel 5 and the discharge starwheel 6 are synchronized with vario clamps 7 disposed on the treatment carousel 8 that are suitable for accommodating containers 9 of differing sizes. The vario clamps 7 have two asymmetrical gripping arms 70, 71, so that not only containers 9 of the first container size but also containers 9 of the second container size can be securely accommodated by the vario clamp 7, without the two gripping arms 70, 71 colliding. The central axis of a container 9 of the first container size, in a state in which it is held by the vario clamp 7, is concentric with the central axis of a container 9 of the second container size, in a state in which it is held by the vario clamp 7. Such vario clamps 7 are known in principle.

Containers 9 of the second container size that are to be treated are conveyed to the infeed starwheel 5. One of the second clamps 3 of the infeed starwheel 5 grips one of the containers 9 to be treated by changing from an open switching position to a closed switching position. The container 9 held by the second clamp 3 is then conveyed to the treatment carousel 8. Here the second clamp 3 transfers the container 9 that it holds to a vario clamp 7 that is synchronized with the second clamp 3. To transfer the container 9, the second clamp pivots from the closed switching position to the open switching position, so that the container 9 is then held by the vario clamp 7, and can be treated by a treatment unit (not shown here) of the treatment carousel, for example a filling unit for filling a container 9. Subsequently, a second clamp 3 of the discharge starwheel 6, which is synchronized with the vario clamp 7, takes over the treated container 9 in order to convey the treated container 9 away.

Because the treatment device 100 shown in FIG. 1 is configured to treat containers 9 of the second container size, the first clamps 2 of the device 1 of the infeed starwheel 5 and the discharge starwheel 6, which are provided to hold containers with the first container size, remain permanently in the closed switching position.

If, in contrast, it is intended that containers of the first container size are to be processed, the first clamps 2 of the device 1 of the infeed starwheel 5 and the discharge starwheel 6 are activated, and the second clamps 3 remain permanently in the closed switching position. In order to enable problem-free transfer of the containers from the infeed starwheel 5 to the treatment carousel 8, and problem-free transfer of the containers from the treatment carousel 8 to the discharge starwheel 6, the first clamps 2 of the infeed starwheel 5 and the discharge starwheel 6 are then synchronized with the vario clamps 7 of the treatment carousel. For this purpose, when the clamp in use is changed from the first clamp 2 to the second clamp 3, the infeed starwheel 5 and the discharge starwheel 6 are rotated by an angle which is appropriate to reestablish synchronization.

Figure 2:
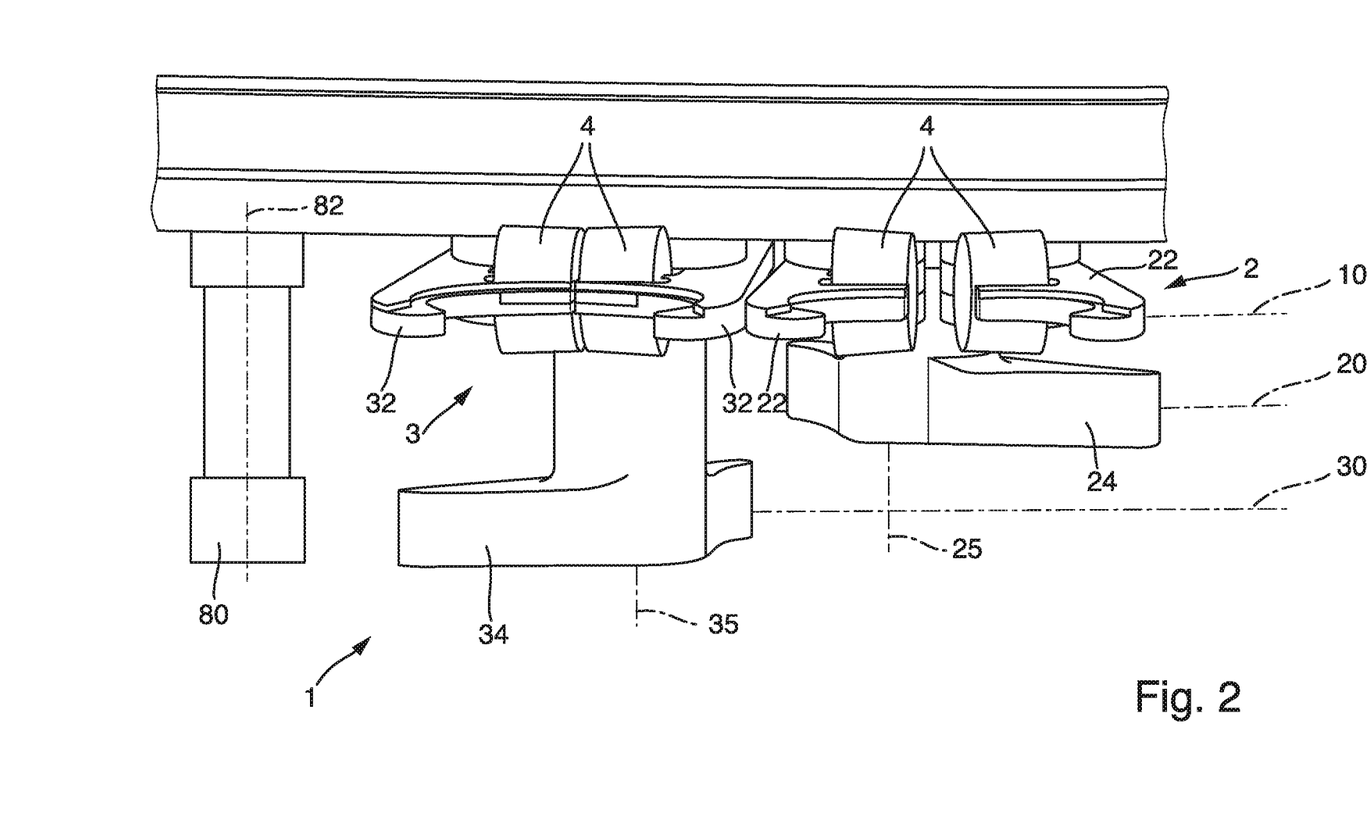
FIG. 2 is a schematic perspective side view of a device for transporting containers from FIG. 1.

FIG. 2 shows a schematic perspective side view of a device 1 for transporting containers 9 from FIG. 1. The first clamp 2 and the second clamp 3 are pivotably disposed in the pivoting plane 10. Below the pivoting plane 10, a first control cam 24 for controlling the switching position of the first clamp 2 is disposed in a first control plane 20, which is parallel to the pivoting plane 10. Below the first control plane 20, a second control cam 34 for controlling the switching position of the second clamp 3 is disposed in a second control plane 30, which is parallel to the pivoting plane 10. The first control cam 24 can be pivoted about a first control axis 25 between a first control position and a second control position. The second control cam 34 can be pivoted about a second control axis 35, again between a first control position and a second control position. The spacing between the first control plane 20 and the second control plane 30 is selected such that the first control cam 24 and the second control cam 34 do not collide with each other during their respective pivoting movements.

In the device 1 that is shown in FIG. 2, the first control cam 24 is in the first switching position, whereby the first clamp 2 is in the open switching position. In this position, the two clamping arms 22 of the first clamp 2 are pushed apart by the magnetic repulsion of two magnetic elements 4 disposed on the clamping arms 22 with equal poles facing each other, such that the clamps are always in an open position unless they are actively closed by means of the control cam 24.

The second control cam 34 is in the second switching position, whereby the second clamp 3 is held against the magnetic force of the magnetic elements 4 in the closed switching position.

Alternatively, the magnetic elements 4 can be disposed on the clamping arms 22 with opposite poles facing each other, so that they attract each other and the clamping arms 22 remain in a closed switching position unless they are actively pushed apart by the action of the control cams.

In order to displace the control cams 24, 34, a control element 80 is provided, which is displaceable between a first control position and a second control position, wherein the control element 80 in the first control position can displace the first control cam 24, and the control element 80 in the second control position can displace the second control cam 34. The first control position is in the first control plane 20, and the second control position is in the second control plane 30. Because the treatment device 8 is configured to treat containers 9 of the second container size, the control element 80 is correspondingly in the second control position, as shown in FIG. 2. In this position, no displacement of the first control cam 24 by the control element 80 takes place, and so the first clamp 2 is not activated, instead remaining in the switching position imposed by the magnetic elements 4.

In the embodiment shown in FIG. 2, the control element 80 is designed as a control hook, which can be displaced perpendicular to the control planes 20, 30 along a displacement axis 82 that is disposed in a fixed position on the treatment device 8, in order to adopt the first control position or the second control position.

Alternatively, the control element 80 can have one or more guide tracks, along which the first and second control cams 24, 34 are guided, i.e. by means of which the positions of the first and second control cams 24, 34 are set.

In a further alternative variant, the control element 80 can be designed as an eccentric lever or eccentric disk, wherein the control element is then disposed such that it can pivot about a further pivot axis. In this case the further pivot axis is generally disposed in a plane parallel to the control planes

20, 30. By this means the control element can have only a single cam, which can be pivoted between the first and the second control position. Alternatively, the control element can be pivotable about a pivot axis disposed obliquely to, or perpendicular to, the control planes 20, 30, wherein the control element then typically has two cams. In this case, the first cam is disposed in the first control plane 20 and the second cam is disposed opposite the first cam in the second control plane 30. By this means, when the first cam is pivoted into the first control position, the second cam is pivoted out of the second control position. Correspondingly, when the first cam is pivoted out of the first control position, the second cam is pivoted into the second control position.

Figure 3:
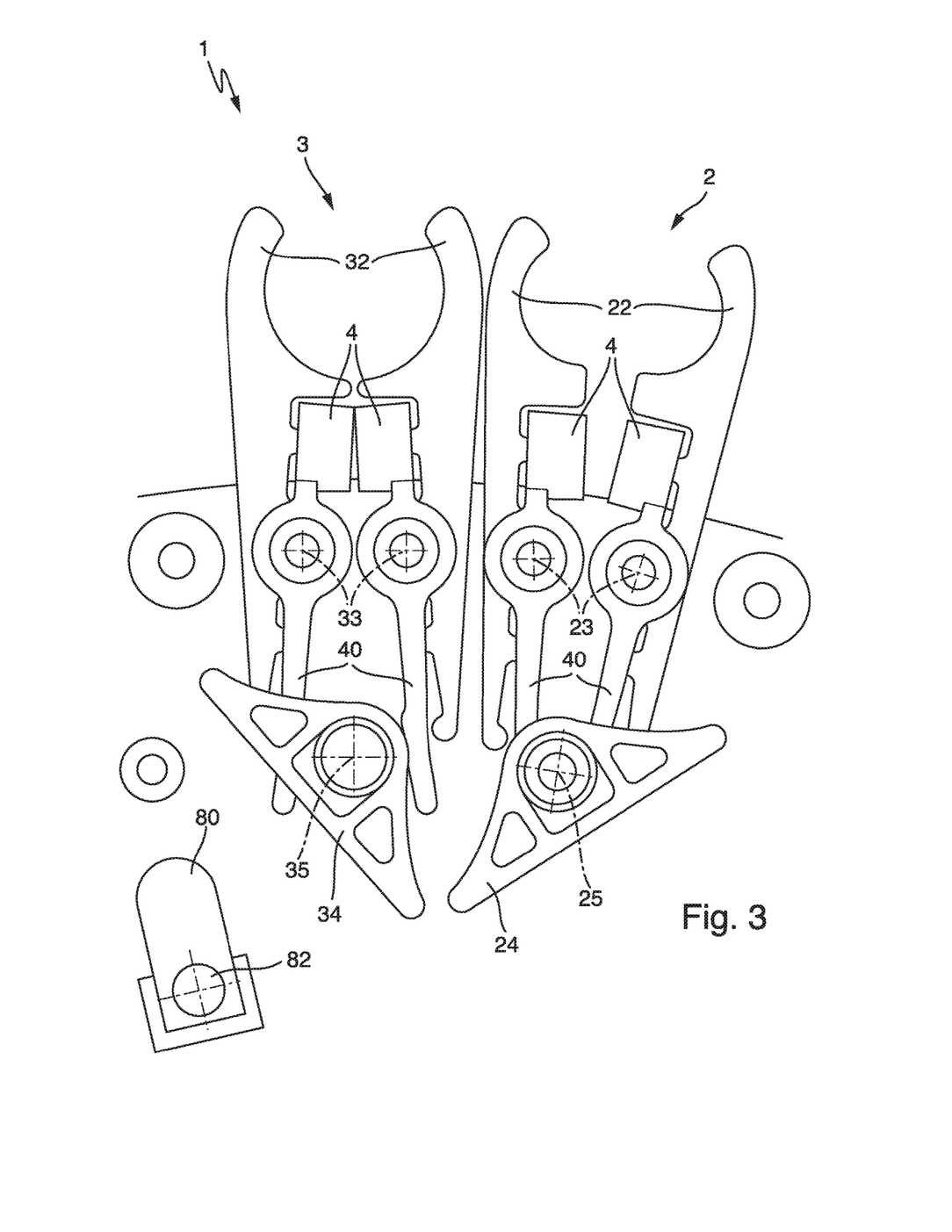
FIG. 3 is a schematic view from below of the device for transporting containers from FIG. 2.

FIG. 3 shows a schematic view from below of the device 1 for transporting containers from FIG. 2. Each of the clamping arms 22, 32 of the two clamps 2, 3 can be pivoted about its own pivot axis 23, 33 in the pivoting plane 10. Because the first control cam 24 is in the first control position, the first clamp 2 is held in the open switching position due to the magnetic repulsion of two magnetic elements 4 disposed on the pivoting arms 22. The second clamp 3 is held in the closed switching position because the second control cam 34 is in the second control position.

Viewed in the direction of the clamps 2, 3, the displacement axis 82 of the control element 80 is behind or inside the clamps 2, 3, so that when the first control cam 24 and the second control cam 34 move past the control element 80 they do not come into contact with the displacement axis 82. The change in position of the first control cam 24 or the second control cam 34 is thus only effected by the control element 80. Because the control element 80 is, as shown in FIG. 2, in the second control position, and thus in the second control plane 30, only the second control cam 34 is displaced when the first control cam 24 and the second control cam 34 move past. The first control cam 24 does not come into contact with the control element 80 and is consequently not displaced. Correspondingly, when the control element 80 is in the first control position only the first control cam 24 is displaced.

Figure 4:
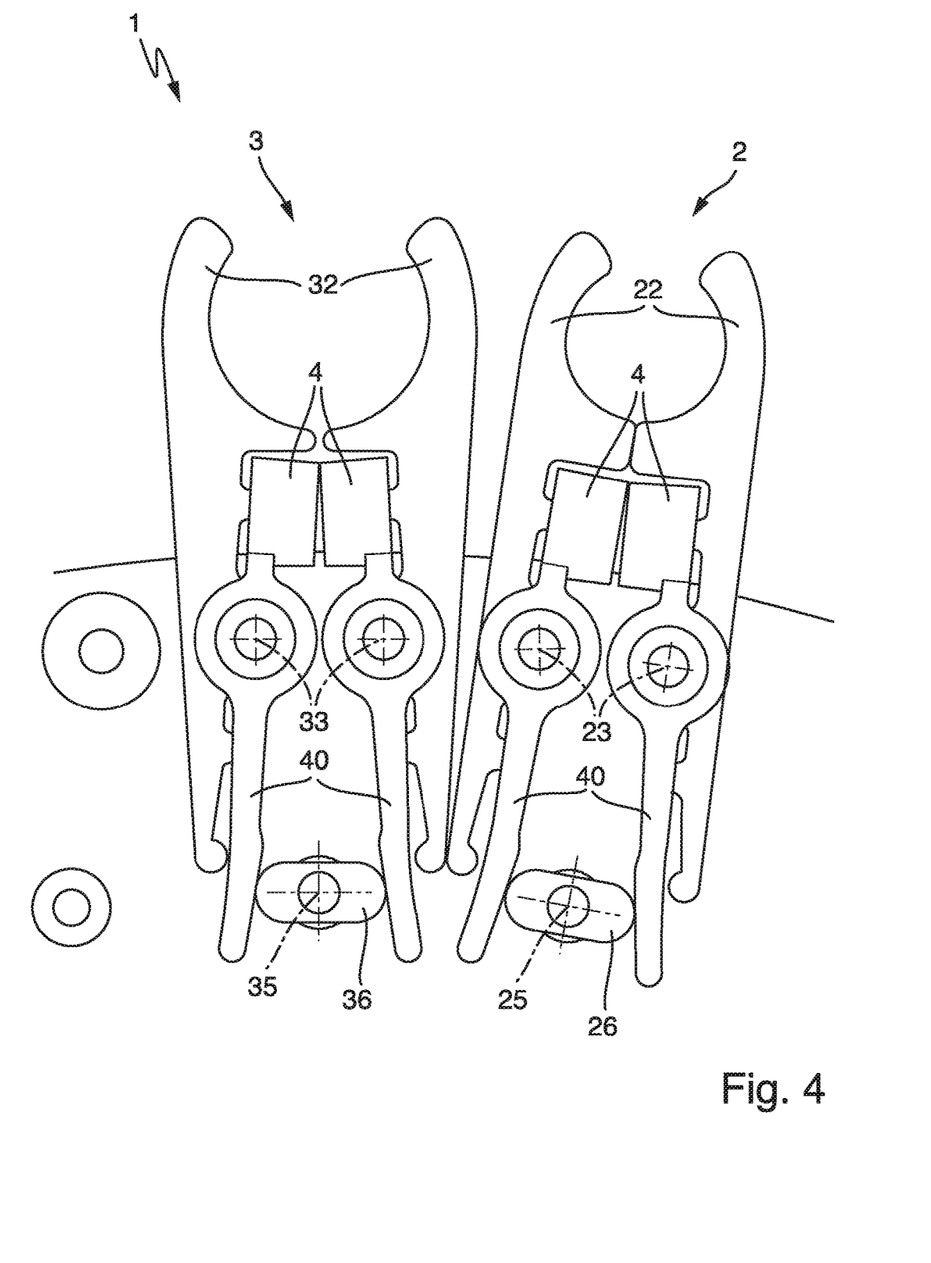
FIG. 4 is a further schematic view from below of the device for transporting containers from FIG. 2.

FIG. 4 shows a further schematic view from below of the device 1 for transporting containers from FIGS. 2 and 3. This view substantially corresponds to the view shown in FIG. 3, but the control cams 24, 34 are not shown. The first and second clamps 2, 3 are both in the closed switching position. By means of the displacement of the first control cam 24 (not shown in FIG. 4) into the second control position, a first control rocker arm 26 disposed in the pivoting plane 10 is rotated about the control axis 25 into the position shown in FIG. 4, so that the clamping arms 22 of the first clamp 2 are pivoted about the pivot axes 23 towards each other via magnetic element carriers 40 disposed on the clamping arms 22. By this means the first clamp 2 is held, as shown, in the closed switching position. When the first control cam 24 is rotated into the first control position, the first control rocker arm 26 is correspondingly rotated, by 90° in the embodiment that is shown, so that pivoting arms 22 are pushed apart from each other about the pivot axes 23 by the magnetic repulsion of the two magnetic elements 4, and the first clamp 2 is thereby pivoted into the open switching position. The second clamp 3 is correspondingly held in the closed switching position by means of a second control rocker arm 36.

Figure 5:
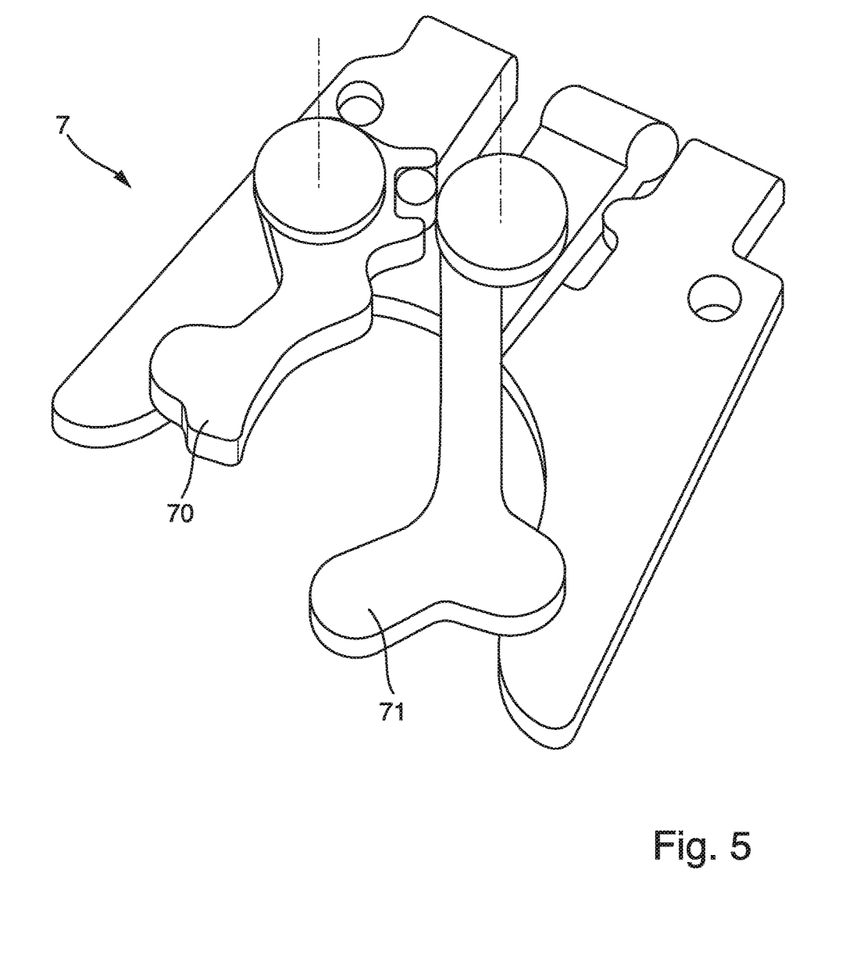
FIG. 5 is a schematic perspective side view of a vario clamp, disposed on the treatment carousel from FIG. 1, for gripping differing sizes of container.

FIG. 5 shows a schematic perspective side view of a vario clamp 7, disposed on the treatment carousel 8 from FIG. 1, for gripping containers 9 of differing sizes. The vario clamp 7 has an asymmetrical pair of gripping arms 70, 71, with a pivotable small gripping arm 70 and a pivotable large gripping arm 71. By this means, containers of differing container sizes can be gripped, without the small gripping arm 70 and the large gripping arm 71 colliding with each other when they grip the container with the smaller container size. The large gripping arm 71 is disposed to the rear, as viewed in the direction of movement of the treatment carousel 8. By this means it is possible to provide a gentle takeover and handover of the container that is to be treated.

In an alternative, two clamps 2, 3 can also be disposed on the treatment carousel 8, as shown in relation to the infeed starwheel 5 and the discharge starwheel 6. In this case, it may be desirable to provide on the treatment carousel 8 a means of synchronizing the applicable treatment element, for example the filling element, with the positions defined by the clamps 2, 3. For example, a transport element carrier can be rotated relative to a treatment element carrier.

To the extent applicable, all individual features described in the example embodiments can be combined with each other and/or exchanged, without departing from the field of the invention.

The invention claimed is:

1. A device for transporting containers in a beverage filling plant, which comprises:
    a first clamp disposed in a pivoting plane and configured to pivot between a first open switching position and a first closed switching position for holding a first container of a first container size;
    a second clamp disposed in the pivoting plane and configured to pivot between a second open switching position and a second closed switching position for holding a second container of a second container size;
    a first control cam configured to control a switching position of the first clamp; and
    a second control cam configured to control a switching position of the second clamp, wherein:
        the first control cam is disposed in a first control plane parallel to the pivoting plane,
        the second control cam is disposed in a second control plane parallel to the pivoting plane, and
        the first control plane and the second control plane are spaced apart from each other.

2. The device of claim 1, wherein the first control cam is further disposed below the pivoting plane.

3. The device of claim 1, wherein the second control cam is further disposed below the first control plane.

4. The device of claim 1, wherein the first control cam is pivotable about a first control axis between a first control position and a second control position.

5. The device of claim 4, wherein the second control cam is pivotable about a second control axis between a third control position and a fourth control position.

6. The device of claim 5, wherein spacing between the first control plane and the second control plane is such that the first control cam and the second control cam do not collide with each during their respective pivoting movements.

7. The device of claim 1, wherein the first clamp and/or the second clamp each comprise two pivotable clamping arms.

8. The device of claim 7, wherein the two pivotable clamping arms each comprise a magnetic element configured to attract or repell the two pivotable clamping arms.

9. The device of claim 1, further comprising a control element displaceable between a first control position and a second control position, wherein in the first control position the control element is configured to displace the first control cam and in the second control position the control element is configured to displace the second control cam.

10. The device of claim 9, wherein the first control position is in the first control plane and the second control position is in the second control plane.

11. The device of claim 9, wherein the control element is configured to pivot between the first control position and the second control position.

12. The device of claim 9, wherein the control element is configured to be displaced horizontally.

13. The device of claim 9, wherein the control element comprises a control hook.

14. A treatment device for treating containers in a beverage filling plant, comprising:
- a treatment carousel configured to treat the containers;
- an infeed starwheel configured to convey the containers to be treated to the treatment carousel;
- a discharge starwheel configured to convey treated containers out of the treatment carousel; and wherein:
- a device for transporting the containers is disposed on the treatment carousel, the infeed starwheel, and/or the discharge starwheel, and
- the device comprises:
  - a first clamp disposed in a pivoting plane and configured to pivot between a first open switching position and a first closed switching position for holding a first container of a first container size;
  - a second clamp disposed in the pivoting plane and configured to pivot between a second open switching position and a second closed switching position for holding a second container of a second container size;
  - a first control cam configured to control a switching position of the first clamp; and
  - a second control cam configured to control a switching position of the second clamp, wherein:
- the first control cam is disposed in a first control plane parallel to the pivoting plane,
- the second control cam is disposed in a second control plane parallel to the pivoting plane, and
- the first control plane and the second control plane are spaced apart from each other.

15. The treatment device of claim 14, wherein the device further comprises a control element displaceable between a first control position and a second control position, wherein in the first control position the control element is configured to displace the first control cam and in the second control position the control element is configured to displace the second control cam.

16. The treatment device of claim 15, wherein the first control position is in the first control plane and the second control position is in the second control plane.

17. The treatment device of claim 14, wherein the treatment carousel comprises at least one vario clamp that is configured to accommodate containers of differing sizes.

18. The treatment device of claim 17, wherein the at least one vario clamp is configured to be synchronized with the first clamp of the infeed starwheel and/or the first clamp of the discharge starwheel.

19. The treatment device of claim 17, wherein the at least one vario clamp is configured to be synchronized with the second clamp of the infeed starwheel and/or the second clamp of the discharge starwheel.

20. The treatment device of claim 17, wherein the at least one vario clamp comprises two asymmetrical pivotable gripping arms.

* * * * *